Figure 1:
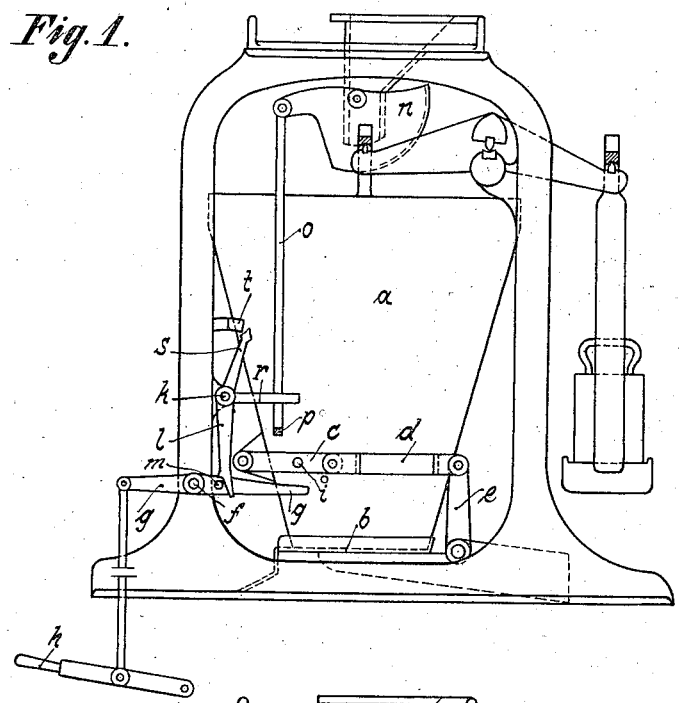

April 28, 1936. W. KADER 2,038,739
LOCKING DEVICE FOR AUTOMATIC WEIGHING MACHINES OR SCALES
Filed March 10, 1930

Inventor
Wilhelm Kader
Attorney

Patented Apr. 28, 1936

2,038,739

UNITED STATES PATENT OFFICE 2,038,739

LOCKING DEVICE FOR AUTOMATIC WEIGHING MACHINES OR SCALES

Wilhelm Kader, Warth, near Hennef-on-the-Sieg, Germany, assignor to the firm of Hennefer Maschinen fabrik C. Reuther & Reisert mit beschrankter Haftung, Hennef-on-the-Sieg, Germany Application March 10, 1930, Serial No. 434,705
In Germany October 21, 1929

2 Claims. (Cl. 221—144)

The present invention refers to a locking device for automatic weighing machines having a material receptacle and hand-operated or mechanical means for opening or dumping the receptacle, said means being held in locked position until weighing has been completed.

In weighing plants, especially such where mixing is carried out, and particularly when the scale operates in combination with packing devices for cement and similar material, it is frequently necessary to open or dump the receptacle when some time has passed, after weighing has been completed by hand. In such cases it is of importance that the emptying of the receptacle is not carried out too soon, that is to say before the weighing is actually completed, because otherwise the operation will be disturbed. It is also of advantage that by an indicator notice is given to the operator when the weighing is finished so as to avoid delay emptying the weighing receptacle.

In the drawing a weighing machine is shown by way of example, in which the receptacle is provided with a bottom flap.

Figure 2:
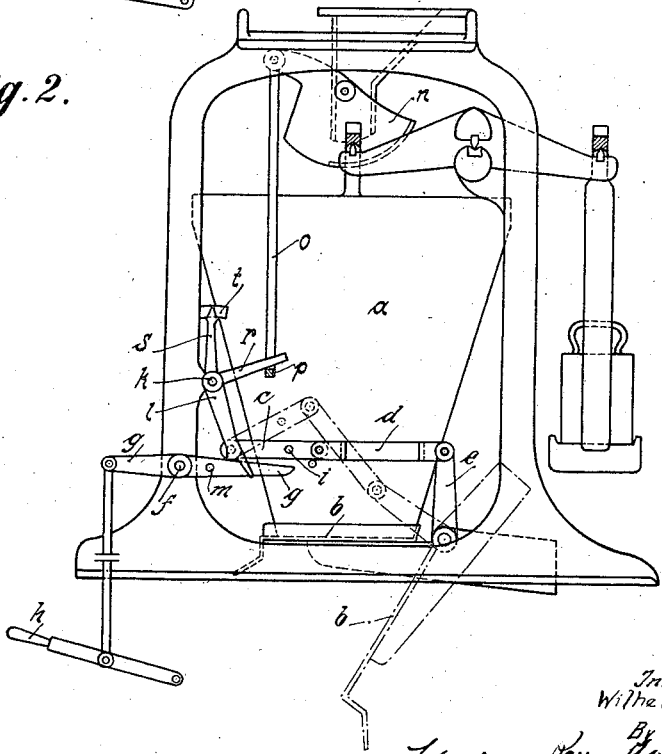

Fig. 1 is an elevation of the weighing machine, the locking means being shown in normal position for preventing opening of the bottom of the weighing receptacle, and Fig. 2 is a similar view shown in a position in which the locking means is withdrawn.

The material receptacle $a$ in the example shown is closed by the bottom flap $b$ held in closed position under the influence of the weight of the material in the receptacle by the usual toggle lever $c$, $d$. One end of the toggle lever is pivoted to the receptacle $a$, and the other end is rotatably connected by an arm $e$ attached to the bottom flap $b$.

To enable the material receptacle to be emptied by hand a two-armed lever $g$ is pivoted at $f$ to the frame of the machine. The outer end of the lever $g$ is connected with a handle $h$ and the other end of the lever $g$ projects under the toggle lever $c$, $d$. A pin or stud $i$ attached to the toggle lever is engaged by the lever $g$ when the handle $h$ is pulled down, whereby the toggle lever $c$, $d$ is collapsed, as is shown in dotted lines in Fig. 2, thus the bottom flap $b$ opening, which opening is assisted by the material within the receptacle falling down.

To prevent an untimely emptying of the receptacle by hand a locking arm $l$ is rotatably pivoted at $k$ to the frame of the scale engaging the lever $g$ by a stud or pin $m$ attached to said lever. Thus the locking arm $l$ prevents the lever $g$ from moving into releasing position by pulling on the handle $h$.

When weighing is completed, whereby the feed valve $n$ is closed in the usual manner, a rod $o$ suspended from an arm on the valve $n$ is moved upwardly, and by a stud or pin $p$ on the rod $o$ an arm $r$ connected with the arm $l$ is moved from the position shown in Fig. 1 to the position shown in Fig. 2, thus withdrawing the arm $l$ from the stud $m$ on the releasing lever $g$. When thus released the lever $g$ may be oscillated by pulling down the handle $h$ of the opening or dumping receptacle $a$.

To give the operator an opportunity to observe the finishing of the weighing operation and to avoid unnecessary loss of time for at once emptying the scale any signal, optical or audible, may be made use of. In the construction shown an indicator arm $s$ is connected with the locking arm $l$. A projection or arm $t$ may be connected with the frame of the scale and be provided with a line or mark, with which the indicator arm $s$ coincides, when the arm $l$ is moved by the rod $o$ into released position.

When the receptacle $a$ is emptied, the bottom flap $b$ returns into its closing position, and by well known means the feed valve $n$ is opened. Fig. 1, thus allowing the rod $o$ to move downwardly releasing the locking arm $l$, which now again locks the lever $g$.

By the employment of the locking arm $l$ it is made impossible to empty the receptacle before weighing has been completed.

I claim:—

1. In a weighing machine, a receptacle provided with an outlet valve, means including a feed valve for supplying material to the receptacle, means for locking the outlet valve in closed position, means for releasing the locking means, a latch for rendering the last-named means inoperative while the feed valve is open, and means operatively connected to the feed valve for disconnecting the latch upon closing of the feed valve.

2. In an automatic weighing machine, a frame, a weighing receptacle supported thereby, means including a pivoted feed valve for supplying material to said receptacle, an outlet valve for said receptacle, toggle means for holding the outlet valve in closed position, a manually operated lever for breaking the toggle means to open the outlet valve, said lever having a locking projection thereon, and means to prevent operation of said lever while the feed valve is open, comprising a double armed lever pivotally mounted on the frame, a rod connected to the feed valve and engaging one arm of said double armed lever, the other arm engaging the locking projection of said manually operated lever to lock it in inoperative position when the feed valve is open, the movement of the feed valve to closed position serving to withdraw the second mentioned arm from locking position.

WILHELM KADER.